(12) United States Patent
Shima

(10) Patent No.: US 12,170,770 B2
(45) Date of Patent: Dec. 17, 2024

(54) IMAGE ENCODING APPARATUS, IMAGE DECODING APPARATUS, CONTROL METHODS AND NON-TRANSITORY COMPUTER-READABLE STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/443,101

(22) Filed: Feb. 15, 2024

(65) Prior Publication Data
US 2024/0195967 A1 Jun. 13, 2024

Related U.S. Application Data

(63) Continuation of application No. 17/346,849, filed on Jun. 14, 2021, now Pat. No. 11,997,276, which is a
(Continued)

(30) Foreign Application Priority Data

Dec. 17, 2018 (JP) .................................. 2018-235910

(51) Int. Cl.
*H04N 19/124* (2014.01)
*H04N 19/119* (2014.01)
(Continued)

(52) U.S. Cl.
CPC ......... *H04N 19/124* (2014.11); *H04N 19/119* (2014.11); *H04N 19/132* (2014.11);
(Continued)

(58) Field of Classification Search
CPC ... H04N 19/124; H04N 19/119; H04N 19/132
See application file for complete search history.

(56) References Cited

U.S. PATENT DOCUMENTS

| | | | |
|---|---|---|---|
| 2013/0114695 A1* | 5/2013 | Joshi | H04N 19/463 375/240.03 |
| 2015/0078442 A1* | 3/2015 | Lim | H04N 19/126 375/240.03 |
| 2018/0324433 A1* | 11/2018 | Lim | H04N 19/126 |

FOREIGN PATENT DOCUMENTS

| | | |
|---|---|---|
| CN | 103238328 A | 8/2013 |
| CN | 103535037 A | 1/2014 |

(Continued)

OTHER PUBLICATIONS

Vo Phuong Binh, et al., Initial Quantization Parameter Determination for H.264/SVC, 2013 International Conference on Computing, Management and Telecommunications (ComManTel), Ho Chi Minh City, Vietnam, 2013

(Continued)

*Primary Examiner* — Dramos Kalapodas
(74) *Attorney, Agent, or Firm* — Canon U.S.A., Inc. IP Division

(57) ABSTRACT

An image decoding apparatus comprises a decoder which decodes data indicating a plurality of values corresponding to a part of a quantization matrix; a generator which derives the plurality of values from the data and generates the matrix; and an inverse quantizing unit which performs the inverse quantizing on an object block using the matrix, wherein, if width or height of the matrix is larger than or equal to a predetermined size, the generating unit generates the matrix by associating a first value among the plurality of values with a first element corresponding to DC component in the matrix, associating a second value with a second element adjacent to the first element, and, for the elements (Continued)

803

| 4 5 / 5 6 | 9 | 13 | 18 | 25 | 35 | 36 | 37 |
|---|---|---|---|---|---|---|---|
| 9 | 10 | 15 | 21 | 32 | 35 | 37 | 41 |
| 13 | 15 | 18 | 23 | 35 | 55 | 58 | 59 |
| 18 | 21 | 23 | 26 | 65 | 58 | 64 | 66 |
| 25 | 32 | 35 | 65 | 66 | 66 | 67 | 70 |
| 35 | 35 | 55 | 58 | 66 | 68 | 70 | 73 |
| 36 | 37 | 58 | 64 | 67 | 70 | 76 | 80 |
| 37 | 41 | 59 | 66 | 70 | 73 | 80 | 85 | other than the first and second elements, associating each of one or more values with a plurality of elements of the matrix.

10 Claims, 15 Drawing Sheets

Related U.S. Application Data continuation of application No. PCT/JP2019/044754, filed on Nov. 14, 2019.

(51) Int. Cl.
*H04N 19/132* (2014.01)
*H04N 19/159* (2014.01)
*H04N 19/176* (2014.01)
*H04N 19/18* (2014.01)

(52) U.S. Cl.
CPC ......... *H04N 19/159* (2014.11); *H04N 19/176* (2014.11); *H04N 19/18* (2014.11)

(56) References Cited

FOREIGN PATENT DOCUMENTS

| JP | 2013146038 A | * | 7/2013 | ........... H04N 19/463 |
| KR | 20130116844 A | | 10/2013 | |
| KR | 20140089583 A | | 7/2014 | |
| WO | WO-2008044511 A1 | * | 4/2008 | ........... H04N 19/115 |

OTHER PUBLICATIONS

Zhong Guo-Yun, et al., Non-square Quadtree Transform Coefficients Energy Distribution Model and Improvement of the Scanning Pattern, Journal of Electronics & Information Technology, vol. 36, No. 10, Oct. 2014 (English abstract is on first page).

Xiang Xioxuan, Research and Optimization of Transformation and Quantization Arithmetic in H.264, Thesis for Master Degree of Engineering, Shenyan Ligong University, Dec. 2010, (English abstract on sixth page).

Recommendation ITU-T H.265, Series H: Audiovisual and Multimedia Systems, Infrastructure of audiovisual services—Coding of moving video, High Efficiency Video Coding, Apr. 2013.

* cited by examiner

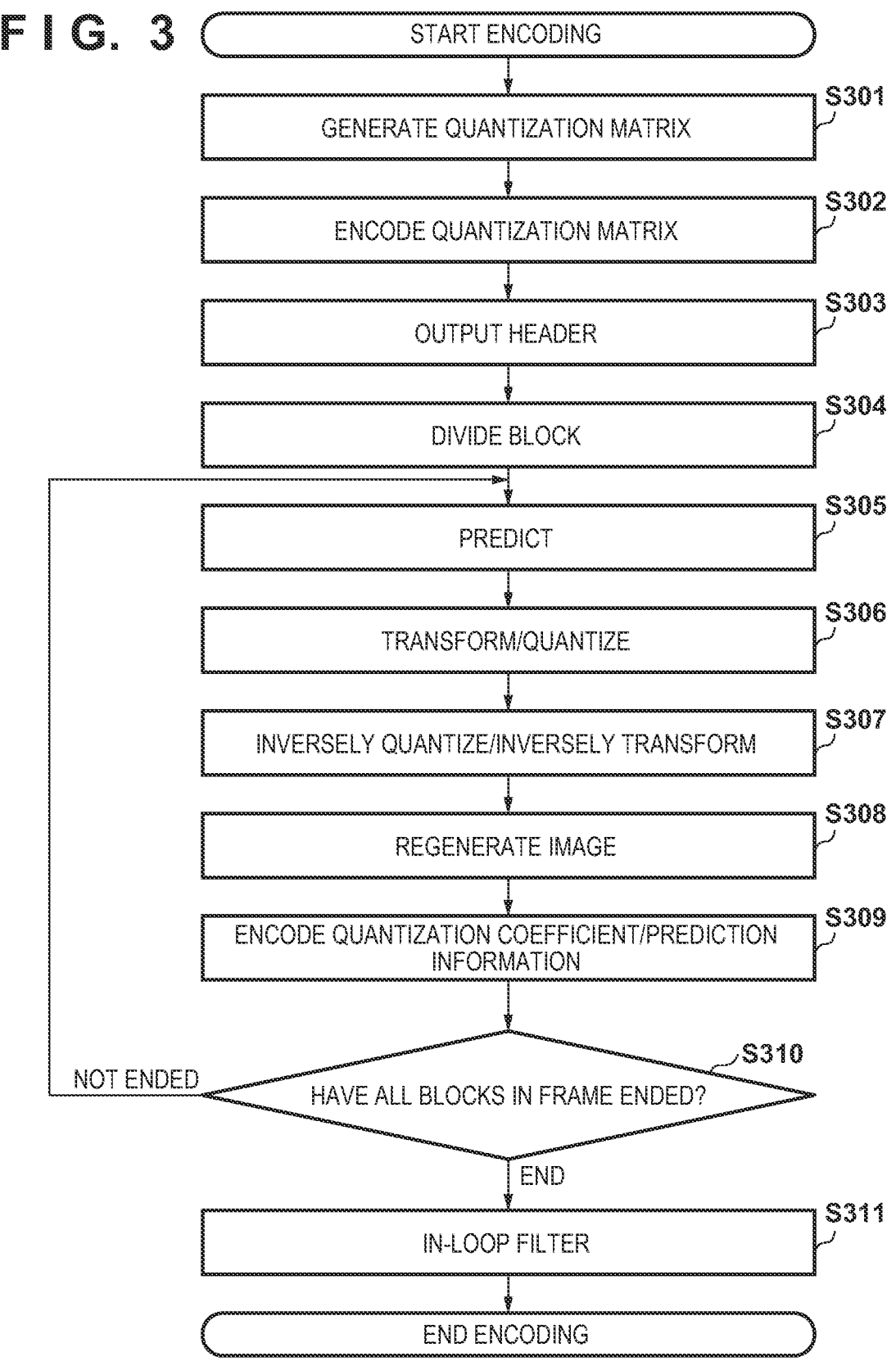

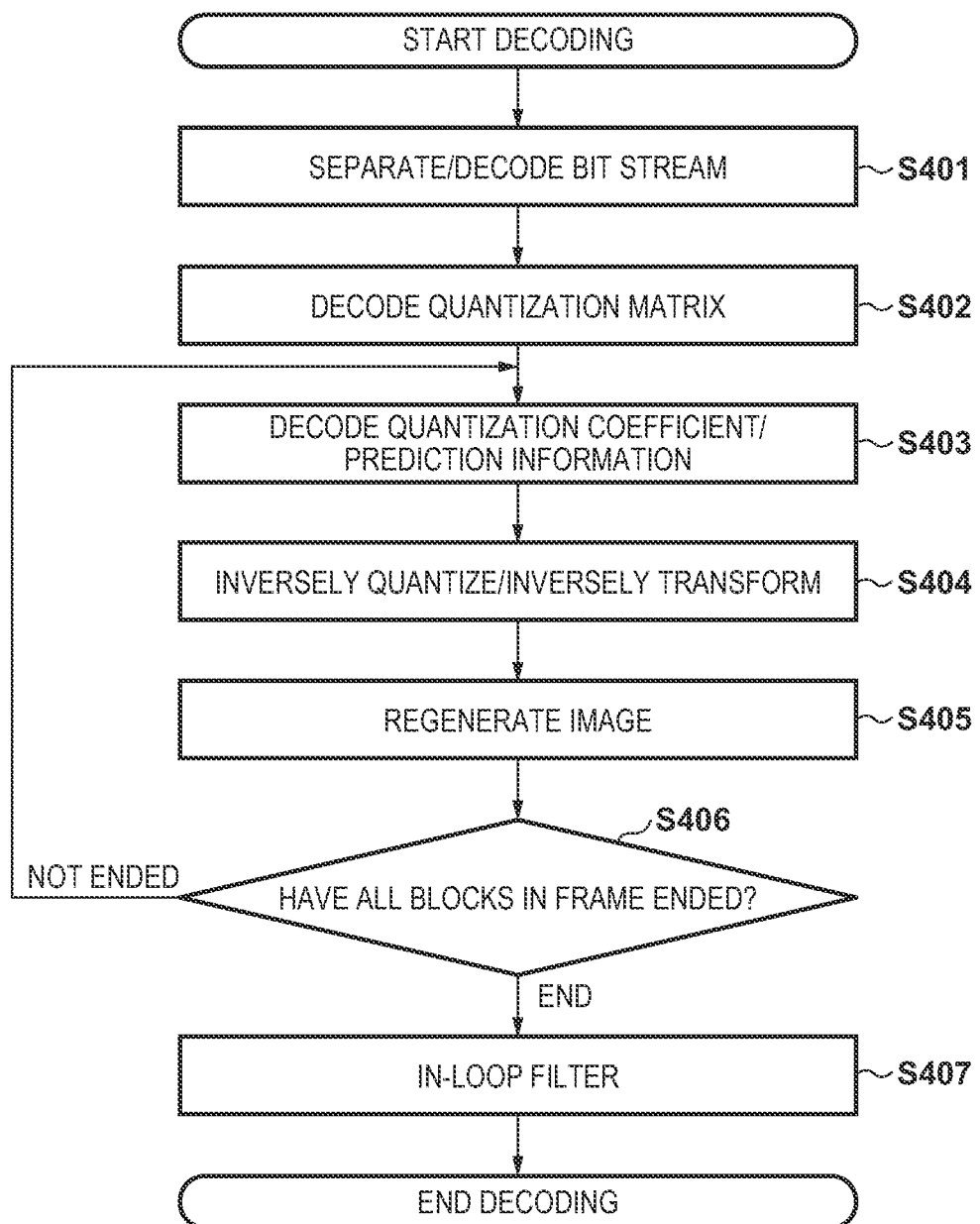

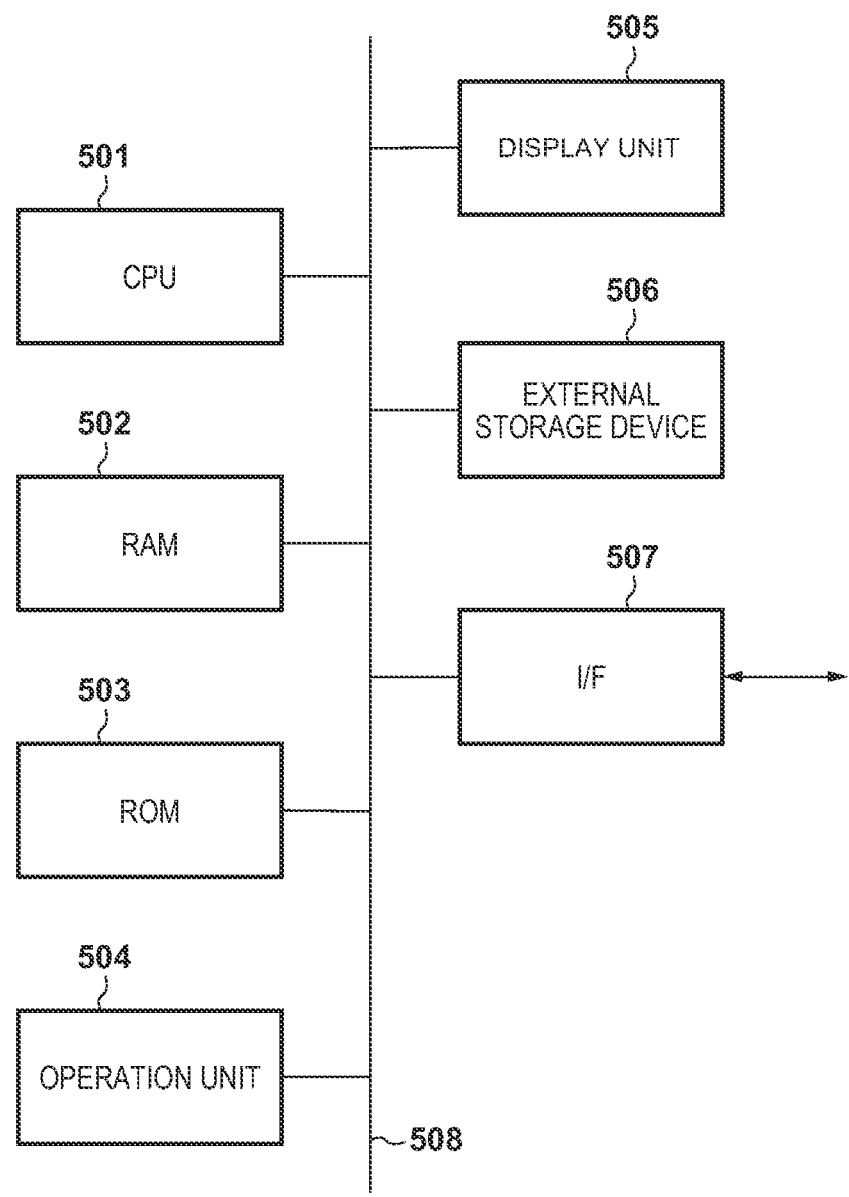

F I G. 7A
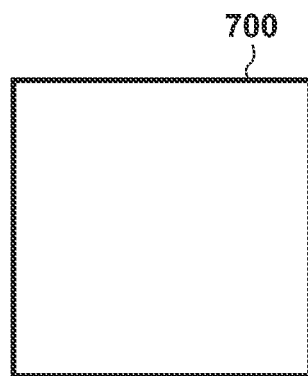
F I G. 7B
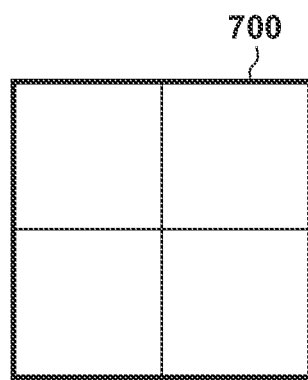
F I G. 7C
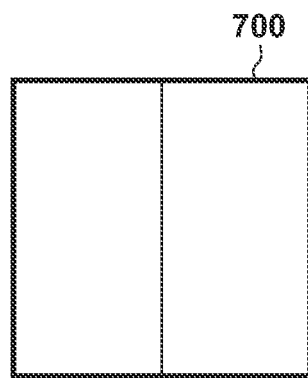

FIG. 8A

|    |    |    |    |    |    |    |    |
|----|----|----|----|----|----|----|----|
| 4  | 9  | 13 | 18 | 25 | 35 | 36 | 37 |
| 9  | 10 | 15 | 21 | 32 | 35 | 37 | 41 |
| 13 | 15 | 18 | 23 | 35 | 55 | 58 | 59 |
| 18 | 21 | 23 | 26 | 65 | 58 | 64 | 66 |
| 25 | 32 | 35 | 65 | 66 | 66 | 67 | 70 |
| 35 | 35 | 55 | 58 | 66 | 68 | 70 | 73 |
| 36 | 37 | 58 | 64 | 67 | 70 | 76 | 80 |
| 37 | 41 | 59 | 66 | 70 | 73 | 80 | 85 |

|    |    |    |    |    |    |    |    |    |
|----|----|----|----|----|----|----|----|----|
| 4  | 5  | 9  | 13 | 18 | 25 | 35 | 36 | 37 |
| 9  |    | 10 | 15 | 21 | 32 | 35 | 37 | 41 |
| 13 |    | 15 | 18 | 23 | 35 | 55 | 58 | 59 |
| 18 |    | 21 | 23 | 26 | 65 | 58 | 64 | 66 |
| 25 |    | 32 | 35 | 65 | 66 | 66 | 67 | 70 |
| 35 |    | 35 | 55 | 58 | 66 | 68 | 70 | 73 |
| 36 |    | 37 | 58 | 64 | 67 | 70 | 76 | 80 |
| 37 |    | 41 | 59 | 66 | 70 | 73 | 80 | 85 |

| 4/5 | 9 | 13 | 18 | 25 | 35 | 36 | 37 |
|---|---|---|---|---|---|---|---|
| 9 | 10 | 15 | 21 | 32 | 35 | 37 | 41 |
| 13 | 15 | 18 | 23 | 35 | 55 | 58 | 59 |
| 18 | 21 | 23 | 26 | 65 | 58 | 64 | 66 |
| 25 | 32 | 35 | 65 | 66 | 66 | 67 | 70 |
| 35 | 35 | 55 | 58 | 66 | 68 | 70 | 73 |
| 36 | 37 | 58 | 64 | 67 | 70 | 76 | 80 |
| 37 | 41 | 59 | 66 | 70 | 73 | 80 | 85 |

| 4 5 / 5 6 | 9 | 13 | 18 | 25 | 35 | 36 | 37 |
|---|---|---|---|---|---|---|---|
| 9 | 10 | 15 | 21 | 32 | 35 | 37 | 41 |
| 13 | 15 | 18 | 23 | 35 | 55 | 58 | 59 |
| 18 | 21 | 23 | 26 | 65 | 58 | 64 | 66 |
| 25 | 32 | 35 | 65 | 66 | 66 | 67 | 70 |
| 35 | 35 | 55 | 58 | 66 | 68 | 70 | 73 |
| 36 | 37 | 58 | 64 | 67 | 70 | 76 | 80 |
| 37 | 41 | 59 | 66 | 70 | 73 | 80 | 85 |

FIG. 9A

| 4 | 5 | 9 | 13 | 18 | 25 | 35 | 36 | 37 |
|---|---|---|----|----|----|----|----|----|
| 13 | 15 | 18 | 23 | 35 | 55 | 58 | 59 |
| 25 | 32 | 35 | 65 | 66 | 66 | 67 | 70 |
| 36 | 37 | 58 | 64 | 67 | 70 | 76 | 80 |

| 4 | 13 | 25 | 36 |
|---|----|----|----|
| 5 |
| 9 | 15 | 32 | 37 |
| 13 | 18 | 35 | 58 |
| 18 | 23 | 65 | 64 |
| 25 | 35 | 66 | 67 |
| 35 | 55 | 66 | 70 |
| 36 | 58 | 67 | 76 |
| 37 | 59 | 70 | 80 |

F I G. 12A

| ENCODING TARGET VALUE | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

F I G. 12B

| ENCODING TARGET VALUE | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

IMAGE ENCODING APPARATUS, IMAGE DECODING APPARATUS, CONTROL METHODS AND NON-TRANSITORY COMPUTER-READABLE STORAGE MEDIUM

CROSS-REFERENCE TO RELATED APPLICATIONS

This application is a Continuation of U.S. patent application Ser. No. 17/346,849, filed on Jun. 14, 2021, which is a Continuation of International Patent Application No. PCT/JP2019/044754, filed Nov. 14, 2019, which claims the benefit of Japanese Patent Application No. 2018-235910, filed Dec. 17, 2018, both of which are hereby incorporated by reference herein in their entirety.

BACKGROUND OF THE INVENTION

Field of the Invention

The present invention relates to an image encoding apparatus, an image decoding apparatus, control methods and non-transitory computer-readable storage medium

Background Art

As an encoding method of compression recording of a moving image, there is known an HEVC (High Efficiency Video Coding) method (to be referred to as HEVC hereinafter). In HEVC, a basic block of a size larger than a conventional macroblock (16×16 pixels) is adopted to improve the encoding efficiency. The basic block of the large size is called a CTU (Coding Tree Unit), and the maximum size is 64×64 pixels. The CTU is further divided into sub-blocks as units of prediction or transform.

In HEVC, processing of weighting, in accordance with a frequency component, a coefficient (to be referred to as an orthogonal transformation coefficient hereinafter) which is obtained after performing orthogonal transformation and is called a quantization matrix is used. By reducing high frequency component data whose deterioration is hardly conspicuous to human vision, it is possible to improve the compression efficiency while maintaining image quality. PTL 1 discloses a technique of encoding such quantization matrix.

In HEVC, orthogonal transformation of, for example, 16×16 pixels or 32×32 pixels, which is larger than conventional orthogonal transformation of 8×8 pixels, is used, and a quantization matrix corresponding to the large orthogonal transformation is also used. To prevent the code amount of the quantization matrix from increasing, instead of encoding all 256 elements of the quantization matrix corresponding to orthogonal transformation of 16×16 pixels, only 64 elements are encoded and expanded by up-sampling processing on the decoding side. Furthermore, an element at the upper left end position of the quantization matrix corresponding to a DC component in a frequency domain is additionally encoded. Therefore, in HEVC, when using large orthogonal transformation, quantization processing of a frequency component other than a DC component cannot be controlled finely.

CITATION LIST

Patent Literature

PTL 1: Japanese Patent Laid-Open No. 2013-38758

SUMMARY OF INVENTION

The present invention has been made to solve the above-described problem, and provides a technique of encoding an image while suppressing the code amount of a quantization matrix used for encoding.

To solve the problem, for example, an image encoding apparatus according to the present invention has the following arrangement. That is, there is provided an image decoding apparatus for decoding an image from encoded data encoded by dividing an image into a plurality of blocks, the apparatus comprising: a decoding unit configured to decode data indicating a plurality of values corresponding to at least a part of elements of a quantization matrix used for inverse quantizing processing which derives transform coefficients from quantized transform coefficients; a generating unit configured to derive the plurality of values from the data, and generate the quantization matrix based on the derived plurality of values; and an inverse quantizing unit configured to perform the inverse quantizing processing on an object block using the quantization matrix, wherein, in a case that at least one of width or height of the quantization matrix is larger than or equal to a predetermined size, the generating unit generates the quantization matrix by: associating a first value among the plurality of values with a first element corresponding to DC component in the quantization matrix, but not associating with other elements in the quantization matrix, associating a second value among the plurality values with a second element adjacent to the first element in the quantization matrix, but not associating with other elements in the quantization matrix, and for at least a part of the elements other than the first and second elements in the quantization matrix, associating each of one or more values among the plurality of values with a plurality of elements of the quantization matrix.

According to the present invention, it is possible to encode an image while suppressing the code amount of a quantization matrix used for encoding.

Further features of the present invention will become apparent from the following description of exemplary embodiments with reference to the attached drawings.

BRIEF DESCRIPTION OF DRAWINGS

FIG. 3 is a flowchart illustrating image encoding processing in the image encoding apparatus according to the first embodiment;

FIG. 4 is a flowchart illustrating image decoding processing in the image decoding apparatus according to the second embodiment;

FIG. 5 is a block diagram showing an example of the hardware arrangement of a computer applicable as an image encoding apparatus or decoding apparatus;

FIG. 7A is a view showing an example of sub-block division used in the embodiment;

FIG. 7B is a view showing another example of sub-block division used in the embodiment;

FIG. 7C is a view showing still another example of sub-block division used in the embodiment;

FIG. 8A is a view showing an example of a quantization matrix used in the embodiment;

FIG. 8B is a view showing another example of the quantization matrix used in the embodiment;

FIG. 8C is a view showing still another example of the quantization matrix used in the embodiment;

FIG. 8D is a view showing still another example of the quantization matrix used in the embodiment;

FIG. 9A is a view showing still another example of the quantization matrix used in the embodiment;

FIG. 9B is a view showing still another example of the quantization matrix used in the embodiment;

FIG. 12A is a table showing an example of an encoding table used for encoding of the difference values of the quantization matrix; and FIG. 12B is a table showing another example of the encoding table used for encoding of the difference values of the quantization matrix.

DESCRIPTION OF EMBODIMENTS

Embodiments of the present invention will be described in detail below with reference to the accompanying drawings. Note that the arrangements according to the following embodiments are merely examples, and the present invention is not limited to the illustrated arrangements.

First Embodiment

Figure 1:
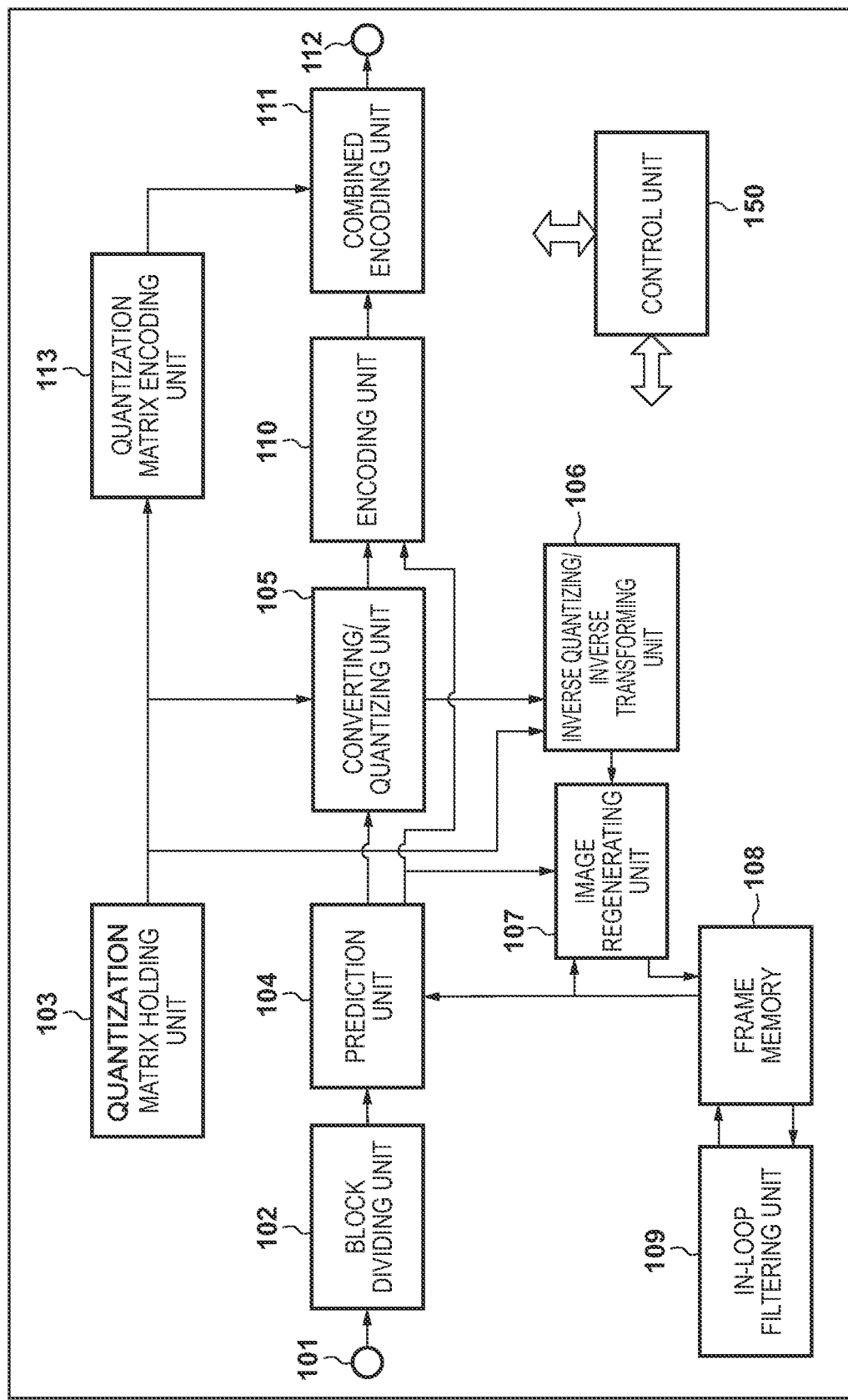
FIG. 1 is a block diagram of an image encoding apparatus according to the first embodiment.

FIG. 1 is a block diagram showing an image encoding apparatus according to the first embodiment. The image encoding apparatus includes a control unit 150 that controls components to be described below and controls the overall apparatus. The control unit 150 includes a CPU, a ROM storing a program executed by the CPU, various parameters, and the like, and a RAM used as the work area of the CPU. Note that after loading an OS (Operating System) stored in the ROM or another nonvolatile storage device, the program, and the parameters into the RAM, the program may be executed under the control of the OS.

The image encoding apparatus further includes an input terminal 101, a block dividing unit 102, a quantization matrix holding unit 103, a prediction unit 104, a transforming/quantizing unit 105, an inverse quantizing/inverse transforming unit 106, an image regenerating unit 107, a frame memory 108, an in-loop filtering unit 109, an encoding unit 110, a combined encoding unit 111, an output terminal 112, and a quantization matrix encoding unit 113.

In the above-described arrangement, image data (for example, 30 frames/sec) is supplied from an image generation source (not shown) to the input terminal 101 of this apparatus. Note that any type of image generation source can be used but is simply an image capturing unit, a video camera, or a hard disk or storage medium storing image data to be encoded.

The block dividing unit 102 divides, into a plurality of basic blocks, the image data input via the input terminal 101, and supplies the basic block-based image data to the prediction unit 104 of the succeeding stage.

The quantization matrix holding unit 103 holds a plurality of kinds of quantization matrices to be used in quantization processing. A method of generating the quantization matrices will be described in detail later.

The prediction unit 104 inputs the basic block-based image data from the block dividing unit 102, decides a method of dividing the image data into a plurality of smaller sub-blocks, and performs intra prediction as intra-frame prediction or inter prediction as inter-frame prediction for each sub-block, thereby generating predicted image data. The prediction unit 104 calculates prediction error data as the difference between the image data of the sub-block and its predicted image data, and supplies it. The prediction unit 104 outputs, together with the prediction error data, information necessary for prediction, for example, information concerning sub-block division and information of a prediction mode, a motion vector, and the like. The information necessary for prediction will be referred to as prediction information hereinafter.

The transforming/quantizing unit 105 obtains a transform coefficient by performing, for each sub-block, orthogonal transformation (frequency transform) for the prediction error data supplied from the prediction unit 104. The transforming/quantizing unit 105 then obtains a quantization coefficient by quantizing the transform coefficient of the sub-block of interest using the quantization matrix held by the quantization matrix holding unit 103.

The inverse quantizing/inverse transforming unit 106 regenerates the transform coefficient by inversely quantizing the quantization coefficient input from the transforming/quantizing unit 105 using the quantization matrix held by the quantization matrix holding unit 103, and also regenerates the prediction error data by performing inverse orthogonal transformation for the transform coefficient.

The image regenerating unit 107 generates predicted image data by referring to the frame memory 108, as needed, based on the prediction information input from the prediction unit 104. Then, the image regenerating unit 107 generates regenerated image data from the generated predicted image data and the prediction error data from the inverse quantizing/inverse transforming unit 106, and outputs it to the frame memory 108 again.

The in-loop filtering unit 109 performs in-loop filtering processing such as deblocking filtering or sample adaptive offsetting for the regenerated image data obtained from the image regenerating unit 107 and stored in the frame memory 108, and stores again, in the frame memory 109, the image data having undergone the filtering processing.

The encoding unit 110 encodes the quantization coefficient input from the transforming/quantizing unit 105 and the prediction information input from the prediction unit 104, generates code data, and outputs it.

The quantization matrix encoding unit 113 encodes the quantization matrix input from the quantization matrix holding unit 103, generates encoded data of the quantization, and outputs it.

The combined encoding unit 111 generates header code data using the encoded data of the quantization matrix encoded by the quantization matrix encoding unit 113. Furthermore, the combined encoding unit 111 forms a bit stream by combining the code data of the image input from the encoding unit 110 with the generated header code data, and externally outputs it via the output terminal 112.

Note that the output destination is not particularly limited but a storage device such as a recording medium, a file server on the network, or the like may be used.

An image encoding operation in the image encoding apparatus according to the embodiment will be described in more detail below.

This embodiment adopts the arrangement for inputting moving image data on a frame basis but may adopt an arrangement for inputting still image data for one frame. This embodiment will describe only intra prediction encoding processing for the sake of descriptive simplicity but the present invention is not limited to this and is also applicable to inter prediction encoding processing. Furthermore, for the sake of description, this embodiment assumes that the size of the basic block based on which the block dividing unit 101 divides an image of one frame is 16 pixels in the horizontal direction×16 pixels in the vertical direction (to be simply referred to as 16×16 pixels hereinafter). However, this is merely an example, and other sizes may be used.

Before encoding of an image, the quantization matrix is encoded.

First, the quantization matrix holding unit 103 generates a plurality of quantization matrices in accordance with sub-blocks of a plurality of sizes used for encoding, and holds them. A thick frame denoted by reference numeral 800 in FIG. 8A represents an example of a quantization matrix corresponding to a size of 8×8 pixels, and values in the matrix indicate elements. An element in the 0th row and 0th column at the upper left corner of the quantization matrix 800 corresponds the transform coefficient of a DC component (direct current component), and the remaining elements respectively correspond to the transform coefficients of AC component (alternating current component). A method of deciding each element forming the quantization matrix is not particularly limited. For example, a predetermined initial value may be used or may be set individually. The quantization matrix may be generated in accordance with the characteristic of the image.

Similarly, the quantization matrix holding unit 103 also generates a quantization matrix corresponding to the size of another sub-block. FIG. 8B shows a quantization matrix 801 corresponding to orthogonal transformation of 16×8 pixels according to this embodiment. An individual value "4" is set as an element in the 0th row and the 0th column corresponding to a DC component, and an individual value "5" is set as an element in the 0th row and the first column next to the right of that element. The element in the 0th row and the first column of the quantization matrix 801 shown in FIG. 8B is an element corresponding to the transform coefficient of an AC component estimated to have a lowest frequency in the shape of the sub-block. On the other hand, with respect to the remaining elements, one value is set for two elements adjacent to each other in the horizontal direction in order to reduce the code amount. For example, the same value "9" is set as each of the elements in the 0th row and the second column and the 0th row and the third column, and the same value "10" is set as each of the elements in the first row and the second column and the first row and the third column.

FIG. 8C shows a quantization matrix 802 corresponding to orthogonal transformation of 8×16 pixels according to this embodiment. An individual value "4" is set as an element in the 0th row and the 0th column corresponding to a DC component, and an individual value "5" is set as an element in the first row and the 0th column immediately under that element. The element in the first row and the 0th column of the quantization matrix 802 shown in FIG. 8C is an element corresponding to the transform coefficient of an AC component estimated to have a lowest frequency in the shape of the sub-block. On the other hand, with respect to the remaining elements, one value is set for two elements adjacent to each other in the vertical direction in order to reduce the code amount. For example, the same value "9" is set as each of the elements in the second row and the 0th column and the third row and the 0th column, and the same value "10" is set as each of the elements in the second row and the first column and the third row and the first column.

FIG. 8D shows a quantization matrix 803 corresponding to orthogonal transformation of 16×16 pixels according to this embodiment. An individual value "4" is set as an element in the 0th row and the 0th column corresponding to a DC component, and, as elements corresponding to AC components adjacent to the DC component, an individual value "5" is set as each of an element in the first row and the 0th column next to the right of that element and an element in the 0th row and the first column immediately under that element, and an individual value "6" is set as a lower right element in the first row and the first column. On the other hand, with respect to the remaining elements, one value is set for 2×2 elements, that is, four elements adjacent to each other in the horizontal and vertical directions in order to reduce the code amount.

As described above, individual values are respectively set as an element corresponding to a DC component in a quantization matrix and elements corresponding to a plurality of low-frequency components around that element, and with respect to the remaining elements, a value is set on a basis of a plurality of elements. This can readily reduce the code amount of the quantization matrix, and finely control quantization of a low-frequency portion to which human vision is sensitive.

The quantization matrix holding unit 103 holds the thus generated quantization matrices 800 to 803. In this embodiment, the four kinds of quantization matrices 800 to 803 shown in FIGS. 8A to 8D are held in a two-dimensional shape. However, each element in each quantization matrix is not limited to this, as a matter of course. Furthermore, it is possible to hold a plurality of quantization matrices for orthogonal transformation of the same size depending on a prediction method (to be described later), for example, depending on whether to use intra prediction or inter prediction or whether an encoding target is a luminance block or a color difference block. In general, to implement quantization processing corresponding to the visual characteristic of the human, an element in a low-frequency portion corresponding to the upper left portion of each of the quantization matrices 800 to 803 has a small value and an element in a high-frequency portion corresponding to a lower right portion of each of the quantization matrices 800 to 803 has a large value, as shown in FIGS. 8A to 8D.

Figure 10A:
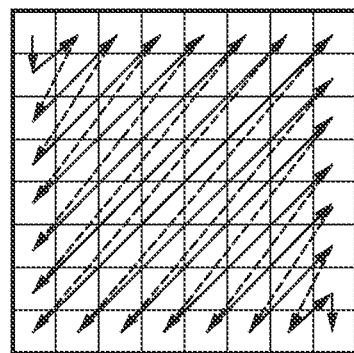
FIG. 10A is a view showing a scan method of the elements of the quantization matrix used in the embodiment.

The quantization matrix encoding unit 113 sequentially reads out, from the quantization matrix holding unit 106, the quantization matrices 800 to 803 stored in the two-dimensional shape, scans each element, and calculates the difference, thereby generating a one-dimensional matrix. In this embodiment, each of the quantization matrices 800 to 803 shown in FIGS. 8A to 8D is encoded. More specifically, with respect to the quantization matrix 800 shown in FIG. 8A, the quantization matrix encoding unit 113 calculates, for each element, the difference between adjacent elements in the scan order using a scan method along with arrows shown in FIG. 10A. For example, the quantization matrix 800 for 8×8 pixels shown in FIG. 8A is scanned by a diagonal scan shown in FIG. 10A. The first element "4" located at the upper left corner is scanned, and the element "9" located immediately under the element "4" is scanned next, thereby calculating +5 as the difference. Furthermore, to encode the first element ("4" in this embodiment) of the quantization matrix, the difference from a predetermined initial value (for example, "8") is calculated. The present invention, however, is not limited to this, as a matter of course, and the difference from an arbitrary value or the value of the first element may be used.

Figure 10B:
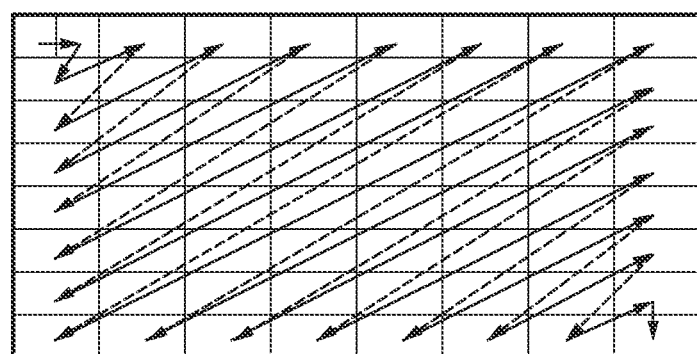
FIG. 10B is a view showing another scan method of the elements of the quantization matrix used in the embodiment.

Similarly, with respect to the quantization matrix 801 shown in FIG. 8B, the quantization matrix encoding unit 113 calculates, for each element, the difference from the immediately preceding element in the scan order using the scan method along arrows shown in FIG. 10B. For example, the quantization matrix 801 for 16×8 pixels shown in FIG. 8B is scanned by a scan method shown in FIG. 10B. The first element "4" located at the upper left end is scanned, and the element "5" located immediately next to the right of the element "4" is scanned next, thereby encoding +1 as the difference. Next, the element "9" located immediately under the element "5" is scanned, thereby encoding +4 as the difference.

Figure 10C:
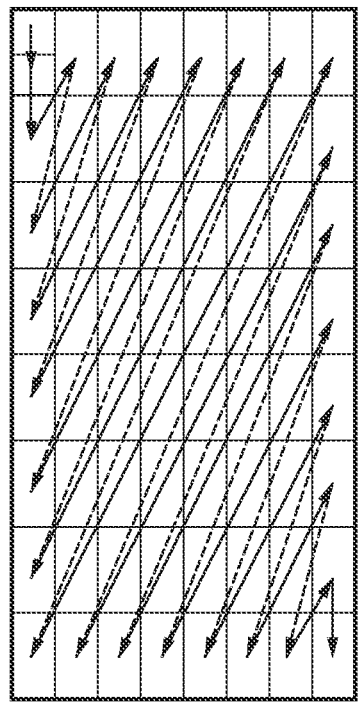
FIG. 10C is a view showing still another scan method of the elements of the quantization matrix used in the embodiment.

The quantization matrix 802 for 8×16 pixels shown in FIG. 8C is scanned by a scan method shown in FIG. 10C. The first element "4" located at the upper left end is scanned, and the element "5" located immediately under the element "4" is scanned next, thereby encoding +1 as the difference. Then, the element "9" located immediately under the element "5" is scanned, thereby encoding +4 as the difference.

Figure 10D:
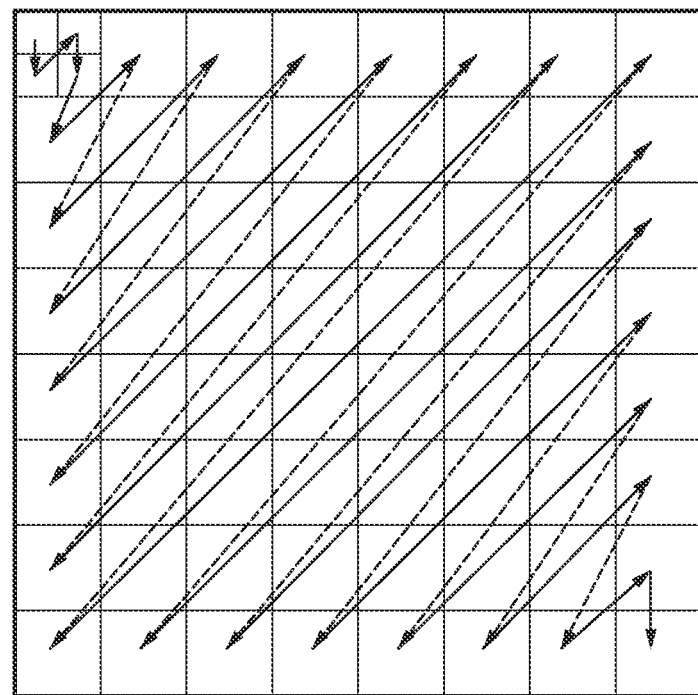
FIG. 10D is a view showing still another scan method of the elements of the quantization matrix used in the embodiment.
Figure 11A:
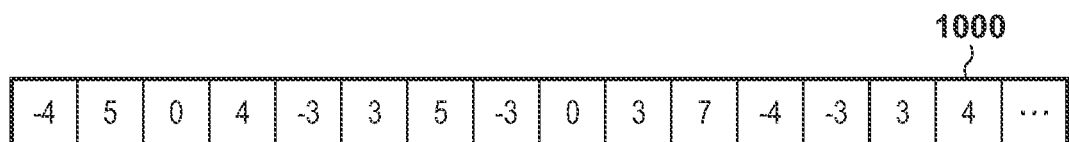
FIG. 11A is a view showing a difference value matrix of the quantization matrix generated according to the embodiment.
Figure 11B:
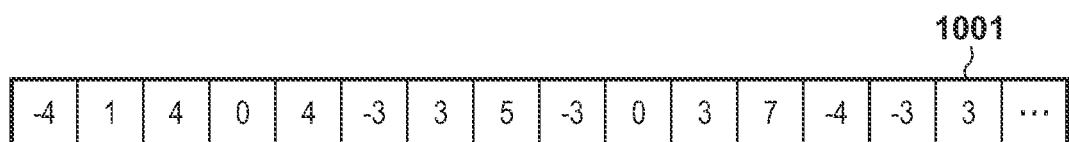
FIG. 11B is a view showing a difference value matrix of the quantization matrix generated according to the embodiment.
Figure 11C:
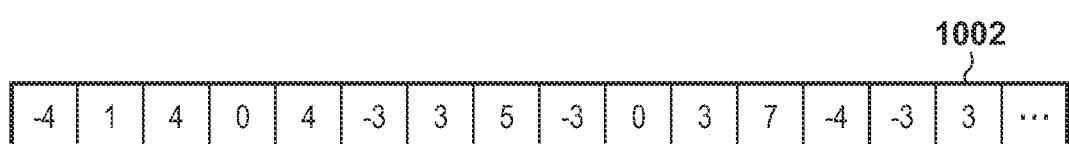
FIG. 11C is a view showing a difference value matrix of the quantization matrix generated according to the embodiment.
Figure 11D:
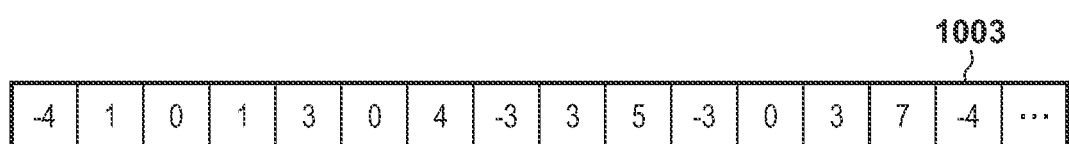
FIG. 11D is a view showing a difference value matrix of the quantization matrix generated according to the embodiment.

The quantization matrix 803 for 16×16 pixels shown in FIG. 8D is scanned by a scan method shown in FIG. 10D. The first element "4" located at the upper left end is scanned, and the element "5" located immediately under the element "4" is scanned next, thereby encoding +1 as the difference. Next, the element "5" located next to the right of the element at the upper left end is scanned, thereby encoding 0 as the difference. Then, the element "6" located immediately under that element "5" is scanned, thereby encoding +1 as the difference.

As described above, in this embodiment, with respect to the quantization matrices 800 to 803 shown in FIGS. 8A to 8D, one-dimensional difference matrices 1000 to 1003 shown in FIGS. 11A to 11D are generated using the scan methods shown in FIGS. 10A to 10D, respectively. The quantization matrix encoding unit 113 further generates quantization matrix code data by encoding the difference matrix. This embodiment assumes that encoding is performed using an encoding table shown in FIG. 12A. However, the encoding table is not limited to this, and for example, an encoding table shown in FIG. 12B may be used.

The thus generated quantization matrix code data is supplied to the combined encoding unit 111 of the succeeding stage.

Referring back to FIG. 1, the combined encoding unit 111 encodes header information necessary for encoding of image data, and combines the code data of the quantization matrix. Subsequently, encoding of the image data will be described.

The block dividing unit 102 divides, into a plurality of basic blocks, image data for one frame input from the input terminal 101, and supplies the basic block-based image data to the prediction unit 104. As described above, in this embodiment, the size of the basic block is 16×16 pixels.

The prediction unit 104 executes prediction processing for the basic block-based image data input from the block dividing unit 102. More specifically, the prediction unit 104 decides a sub-block division method of further dividing the basic block into sub-blocks, and decides an intra prediction mode of horizontal or vertical prediction on a sub-block basis. Note that the sub-block division method is decided from the encoded data amount of an immediately preceding frame and the like.

Figure 7D:
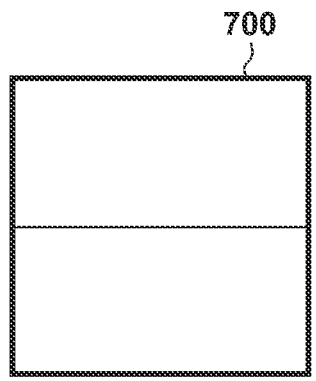
FIG. 7D is a view showing still another example of sub-block division used in the embodiment.

FIGS. 7A to 7D each show an example of a sub-block division pattern. Reference numeral 700 denoting an outer thick frame in each of FIGS. 7A to 7D represents a basic block which has a size of 16×16 pixels in this embodiment. A rectangle within the thick frame represents a sub-block. FIG. 7A shows an example of a basic block=1 sub-block. FIG. 7B shows an example of conventional square sub-block division, in which the basic block of 16×16 pixels is divided into four sub-blocks of a size of 8×8 pixels. On the other hand, FIGS. 7C and 7D each show an example of rectangle sub-block division. In FIG. 7C, the basic block is divided into two vertically long sub-blocks of 8×16 pixels. In FIG. 7D, the basic block is divided into two horizontally long sub-blocks of 16×8 pixels.

Figure 7E:
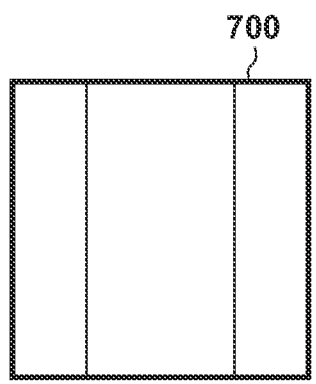
FIG. 7E is a view showing still another example of sub-block division used in the embodiment.
Figure 7F:
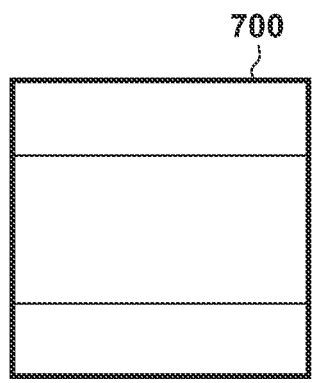
FIG. 7F is a view showing still another example of sub-block division used in the embodiment.

In this embodiment, it is decided whether the basic block of 16×16 pixels is not divided (FIG. 7A), is divided into two vertically long sub-blocks (FIG. 7C), is divided into two horizontally long sub-blocks (FIG. 7D), or undergoes quad-tree division (FIG. 7B). However, the sub-block division method is not limited to them. As shown in FIGS. 7E and 7F, ternary-tree division for dividing the basic block at a ratio of 1:2:1 may be used.

Predicted image data is generated from the decided intra prediction mode and encoded pixels. Then, the prediction unit 104 generates, for each sub-bock, prediction error data as the difference between the input image data and the generated predicted image data, and supplies the generated prediction error data to the transforming/quantizing unit 105. Furthermore, information of sub-block division, the intra prediction mode, and the like is supplied as prediction information to the encoding unit 110 and the image regenerating unit 107.

The transforming/quantizing unit 105 performs orthogonal transformation/quantization for the input prediction error data to generate a quantization coefficient. More specifically, the transforming/quantizing unit 105 performs orthogonal transformation processing corresponding to the size of the sub-block to generate an orthogonal transformation coefficient. Then, the transforming/quantizing unit 105 quantizes, on a sub-block basis, the orthogonal transformation coefficient using the quantization matrix of the corresponding size stored in the quantization matrix holding unit 103, thereby generating a quantization coefficient. This embodiment assumes that the quantization matrix shown in FIG. 8D is used for sub-block division of 16×16 pixels corresponding to FIG. 7A. Similarly, the quantization matrix shown in FIG. 8C is used for sub-block division of 8×16 pixels corresponding to FIG. 7C, and the quantization matrix shown in FIG. 8B is used for sub-block division of 16×8 pixels corresponding to FIG. 7D. The quantization matrix shown in FIG. 8A is used for sub-block division (quad-tree division), shown in FIG. 7B, of ½ the size of the basic block in the vertical and horizontal directions. The transforming/quantizing unit 105 supplies the generated quantization coefficient (transform coefficient after quantization) to the encoding unit 110 and the inverse quantizing/inverse transforming unit 106.

The inverse quantizing/inverse transforming unit 106 regenerates, on a sub-block basis, the transform coefficient by inversely quantizing the input quantization coefficient using the corresponding quantization matrix stored in the quantization matrix holding unit 103. Then, the inverse quantizing/inverse transforming unit 106 regenerates, on a sub-block basis, the prediction error data by performing inverse orthogonal transformation for the regenerated transform coefficient, and supplies the regenerated prediction error data to the image regenerating unit 107.

The image regenerating unit 107 regenerates predicted image data on a sub-block basis based on the prediction information input from the prediction unit 104 by referring to the frame memory 108, as needed. The image regenerating unit 107 regenerates, on a sub-block basis, the image data of the sub-block by adding the regenerated predicted image data and the prediction error data input from the inverse quantizing/inverse transforming unit 106, and stores the regenerated image data in the frame memory 108.

The in-loop filtering unit 109 reads out the regenerated image data from the frame memory 108 on a sub-block basis, and performs in-loop filtering processing such as deblocking filtering. Then, the in-loop filtering unit 109 stores again, in the frame memory 108, the image data having undergone the filtering processing.

The encoding unit 110 performs, on a sub-block basis, entropy encoding for the quantization coefficient generated by the transforming/quantizing unit 105 and the prediction information input from the prediction unit 104, thereby generating code data. Any entropy encoding method can be used, and Golomb coding, arithmetic coding, Huffman coding, or the like can be used. The generated code data is supplied to the combined encoding unit 111.

The combined encoding unit 111 forms a bit stream by multiplexing the code data input from the encoding unit 110 and the like together with the above-described header code data. Finally, the bit stream is externally output from the terminal 112.

Figure 6A:
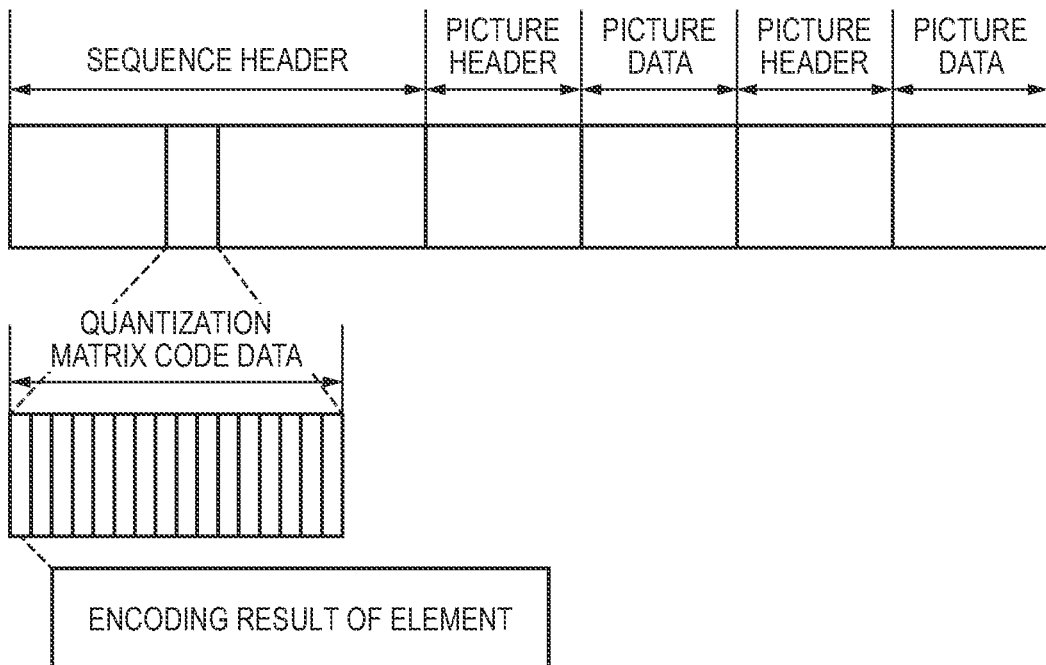
FIG. 6A is a view showing an example of a bit stream structure generated according to the first embodiment.

FIG. 6A shows an example of the data structure of the output bit steam according to the first embodiment. A sequence header includes the code data corresponding to each of the quantization matrices 800 to 803 shown in FIG. 8A to 8D, which is formed by the encoding result of each element. However, an encoding position is not limited to this, and may be in a picture header portion or another header portion, as a matter of course. If the quantization matrix is changed in one sequence, the quantization matrix can be updated by newly encoding it. At this time, the entire quantization matrix may be rewritten or a portion of the quantization matrix to be rewritten may be changed by designating a transform block size.

The processing procedure of encoding processing of one frame in the image encoding apparatus according to the first embodiment will be described below with reference to a flowchart illustrated in FIG. 3. Note that in the following description, in each step, the main subject executes each process under the control of the control unit 150.

Before encoding of an image, in step S301, the quantization matrix holding unit 103 generates a plurality of kinds of quantization matrices and holds them. This embodiment assumes that the quantization matrix holding unit 103 generates the four kinds of quantization matrices 800 to 803 shown in FIGS. 8A to 8D, and holds them.

In step S302, the quantization matrix encoding unit 113 calculates the difference of each element by scanning the quantization matrix generated and held in step S301, and then generates a one-dimensional difference matrix. In this embodiment, the quantization matrix encoding unit 113 obtains the difference value between two successive elements along the scan order shown in each of FIGS. 10A to 10D by scanning each of the quantization matrices 800 to 803 shown in FIGS. 8A to 8D, thereby generating a one-dimensional matrix of the difference values shown in each of FIGS. 11A to 11D. Then, the quantization matrix encoding unit 113 generates binary codes from the individual difference values in the generated matrix with reference to the encoding table shown in FIG. 12A (or FIG. 12B), thereby generating encoded data.

In step S303, the combined encoding unit 111 generates header information necessary for encoding of the image data together with the generated quantization matrix code data, and outputs the header information.

In step S304, the block dividing unit 102 divides the frame-based input image on a basic block basis. In step S305, the prediction unit 104 inputs image data of one basic block generated in step S304, and performs transform into one or more sub-blocks. Then, the prediction unit 104 executes prediction processing for each sub-block, and generates predicted image data and prediction information such as sub-block division information and an intra prediction mode. Then, the prediction unit 104 calculates prediction error data from the image data of each sub-block and the predicted image data.

In step S306, the transforming/quantizing unit 105 performs orthogonal transformation for the prediction error data of each sub-block calculated in step S305 to generate a transform coefficient. Furthermore, the transforming/quantizing unit 105 quantizes the prediction error data of each sub-block using the quantization matrix generated and held in step S301 to generate a quantization coefficient. In this embodiment, the quantization matrix 803 shown in FIG. 8D is used for each sub-block obtained by sub-block division corresponding to FIG. 7A. Similarly, the quantization matrix 802 shown in FIG. 8C is used for each sub-block obtained by sub-block division shown in FIG. 7C. The quantization matrix 801 shown in FIG. 8B is used for each sub-block obtained by sub-block division shown in FIG. 7D. Furthermore, the quantization matrix 800 shown in FIG. 8A is used for four sub-blocks obtained by quad-tree division, as shown in FIG. 7B.

In step S307, the inverse quantizing/inverse transforming unit 106 performs, using the quantization matrix generated and held in step S301, inverse quantization for the quantization coefficient of each sub-block generated in step S305, thereby regenerating the transform coefficient. The inverse quantizing/inverse transforming unit 106 also performs inverse orthogonal transformation for the transform coefficient of each sub-block, thereby regenerating the prediction error data for each sub-block.

In step S308, the image regenerating unit 107 regenerates the predicted image data for each sub-block based on the prediction information generated in step S305. The image regenerating unit 107 regenerates the image data for each sub-block by adding the prediction error data of the corresponding sub-block generated in step S307 to the generated predicted image data of each sub-block.

In step S309, the encoding unit 110 encodes, for each sub-block, the prediction information generated in step S305 and the quantization coefficient generated in step S306, thereby generating code data. Furthermore, a bit stream is generated by including other code data.

In step S310, the control unit 150 determines whether encoding of the all the basic blocks in the frame has ended. If encoding has ended, the control unit 150 advances to step S311; otherwise, the control unit 150 returns the process to step S305 to encode the next basic block.

In step S311, the in-loop filtering unit 109 performs in-loop filtering processing for the image data regenerated in step S308 to generate an image having undergone the filtering processing, thereby ending the processing.

In the above-described processing, when encoding the second frame or a subsequent frame of the moving image, steps S304 to S311 are repeated until the final frame to be encoded is input.

With the above arrangement and operation, it is possible to reduce the code amount of the quantization matrix by individually encoding, in step S302, a predetermined number of elements (an element for a DC component and elements, adjacent to the element, for relatively low-frequency components) of the quantization matrix and encoding the remaining elements on a basis of a plurality of elements. Furthermore, it is possible to finely control quantization of a low-frequency portion to which human vision is sensitive.

Note that this embodiment adopts the arrangement in which all the four kinds of quantization matrices 800 to 803 shown in FIGS. 8A to 8D are encoded. However, an arrangement in which the quantization matrix is generated using another quantization matrix in a decoding side apparatus, instead of individually encoding the four kinds of quantization matrices, may be adopted. For example, in an arrangement for generating a quantization matrix of 16×8 pixels using an encoded quantization matrix of 16×16 pixels instead of encoding the quantization matrix of 16×8 pixels, the decoding side apparatus generates the quantization matrix 801 shown in FIG. 8B by thinning out some elements from the quantization matrix 803 shown in FIG. 8D. Similarly, the decoding side apparatus can also generate the quantization matrix 802 shown in FIG. 8C by thinning out some elements from the quantization matrix 803 shown in FIG. 8D. Furthermore, by deciding, between the encoding side apparatus and the decoding side apparatus, a method of calculating the element "5" in the 0th row and the first column in FIG. 8B or the element "5" in the first row and the 0th column in FIG. 8C, it is possible to generate the quantization matrix 801 shown in FIG. 8B or the quantization matrix 802 shown in FIG. 8C using the quantization matrix 800 shown in FIG. 8A. The calculation method at this time is not particularly limited. Calculation may be performed by adding a specific difference value (+1 in this embodiment) to the element "4" in the 0th row and the 0th column or by using interpolation with peripheral elements. Note that in FIG. 8C, +1 is added to the element corresponding to the DC component with respect to the lower and right elements of the element corresponding to the DC component of the transform coefficient, and +2 is added to the element corresponding to the DC component with respect to the lower right element.

Furthermore, the element "5" in the 0th row and the first column in FIG. 8B or the element "5" in the first row and the 0th column in FIG. 8C may be encoded together with the elements of the quantization matrix of 16×16 pixels.

This can encode the bit stream with the reduced code amount of the quantization matrix.

Figure 6B:
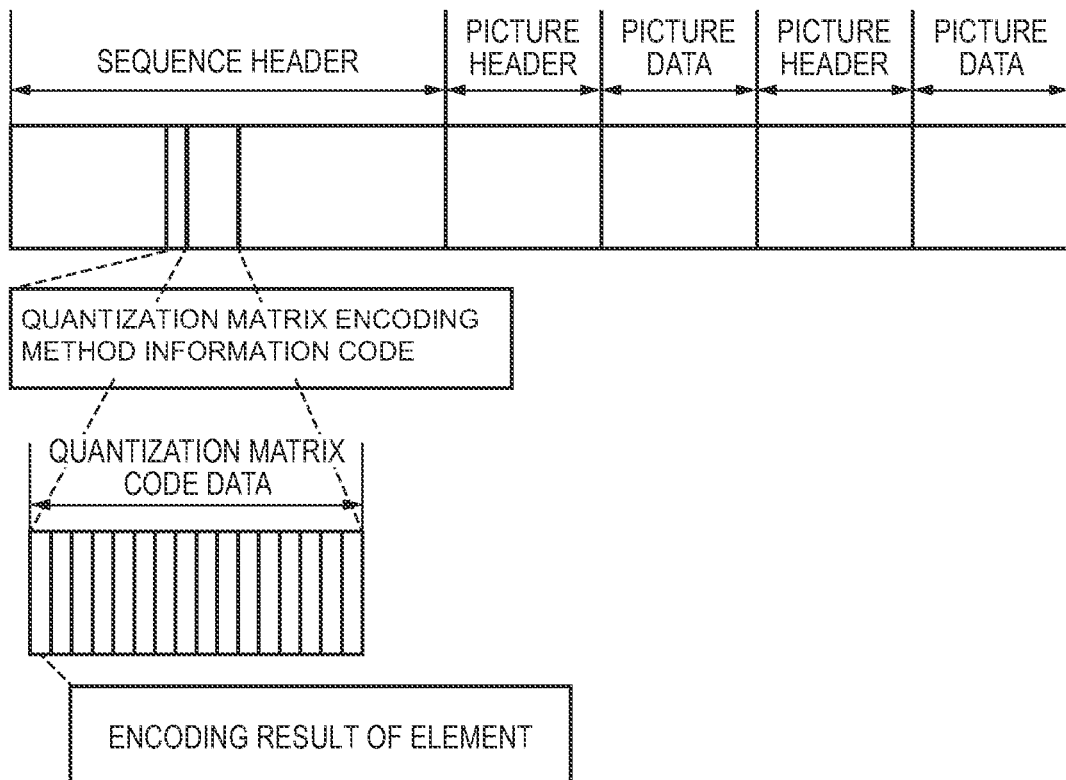
FIG. 6B is a view showing another example of the bit stream structure generated according to the first embodiment.

Furthermore, an arrangement for selecting, for each quantization matrix, whether to generate the quantization matrix from another quantization matrix or encode each element and encoding an identifier in a header may be adopted. For example, an arrangement for encoding, in a header portion, as a quantization matrix encoding method information code, information indicating whether to generate each element of a quantization matrix from another quantization matrix or individually encode elements, and generating a bit stream shown in FIG. 6B may be adopted. This can selectively generate a bit stream which prioritizes image quality control corresponding to the size of the sub-block or a bit stream with a smaller code amount of the quantization matrix.

This embodiment adopts the arrangement in which the quantization matrices shown in FIGS. 8A to 8D corresponding to sub-block division/orthogonal transformation processes shown in FIGS. 7A to 7D are used. However, the orthogonal transformation size and quantization matrix used are not limited to them. For example, if ternary-tree division for division at a ratio of 1:2:1, as shown in FIG. 7E or 7F, is further used, a quantization matrix 900 or 901 shown in FIG. 9A or 9B may further be used.

As described above, the quantization matrix holding unit 103 according to the embodiment individually holds an element at a position corresponding to each transform coefficient within a preset predetermined range (a range of a distance "1" in this embodiment) from the storage position of the element corresponding to the DC component in the long side direction of the quantization matrix 801 or 802 shown in FIG. 8B or 8C whose size is the same as that of the basic block (a size of 16×16 pixels in this embodiment) in only one of the horizontal and vertical directions and is different in the other direction, and holds the same element on a basis of a preset number (two in this embodiment) of elements of the transform coefficients at a position outside the predetermined range in the long side direction. On the other hand, in the short side direction of the quantization matrix shown in FIG. 8B or 8C, an element of the quantization matrix is arranged for each transform coefficient.

With respect to the quantization matrix whose size is the same as that of the basic block in both the horizontal and vertical directions, four elements (a range of a distance "1" in this embodiment) at the position of the element corresponding to the DC component and positions adjacent to that position on the right, lower, and lower right sides are individually held for respective corresponding transform coefficients, as shown in FIG. 8D. With respect to the remaining transform coefficients, one element is held for four adjacent transform coefficients. In the case of the quantization matrix of the size of 8×8 pixels, as shown in FIG. 8A, an element is held for each transform coefficient.

Since assignment of elements to transform coefficients is changed adaptively in accordance with the size of the quantization matrix, it is possible to suppress the code amount of the quantization matrix and suppress image quality deterioration.

Note that the "predetermined range" may be defined based on the scan order shown in each of FIGS. 10A to 10D when encoding the elements of the quantization matrix. With respect to the block size of the coefficients of 8×16 or 16×8 pixels, a scan shown in FIG. 10B or 10C is performed for encoding/decoding of the elements of the quantization matrix. At this time, in the processing of the decoding apparatus (to be described later), an element obtained by one scan operation (a range of a distance "1") from the element corresponding to the DC component of the transform coefficient is assigned for each transform coefficient, and then one element is assigned for every two transform coefficients. That is, in the processing of the decoding apparatus, the quantization matrix 801 or 802 shown in FIG. 8B or 8C is obtained. With respect to the block size of the transform coefficients of 16×16 pixels, elements obtained by three scan operations (a range of a distance "3") from the element corresponding to the DC component of the transform coefficient are assigned for respective transform coefficients, and then one element is assigned for every four transform coefficients. That is, the quantization matrix 803 shown in FIG. 8D is obtained. With respect to the block size of the transform coefficients of 8×8 pixels, elements obtained by scanning all the elements from the element corresponding to the DC component of the transform coefficient are assigned for respective transform coefficients. That is, the quantization matrix 800 shown in FIG. 8A is obtained in the processing of the decoding apparatus. As described above, based on the scan on the quantization matrix, assignment of elements to the transform coefficients may be adaptively changed in accordance with the size of the quantization matrix. In this case, it is unnecessary to particularly consider the positional relationship between the elements.

Second Embodiment

Figure 2:
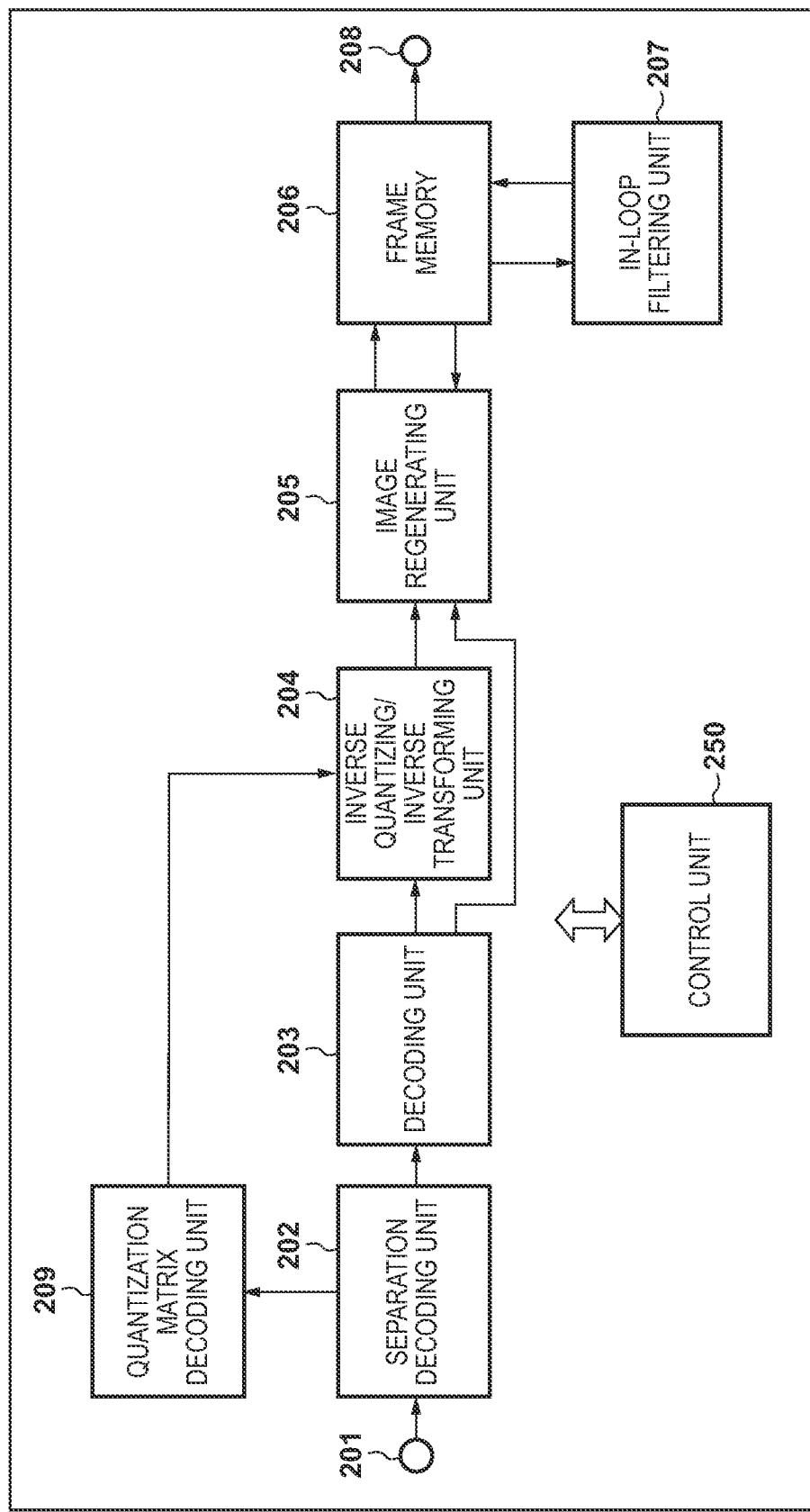
FIG. 2 is a block diagram of an image decoding apparatus according to the second embodiment.

The second embodiment will describe an image decoding apparatus for decoding encoded data generated by the image encoding apparatus of the above-described first embodiment. FIG. 2 is a block diagram of the image decoding apparatus.

The image decoding apparatus includes a control unit 250 that controls components to be described below and controls the overall apparatus. The control unit 250 includes a CPU, a ROM storing a program executed by the CPU, various parameters, and the like, and a RAM used as the work area of the CPU. Note that after loading an OS (Operating System) stored in the ROM or another nonvolatile storage device, the program, and the parameters into the RAM, the program may be executed under the control of the OS.

The image decoding apparatus further includes an input terminal 201, a separation decoding unit 202, a decoding unit 203, an inverse quantizing/inverse transforming unit 204, an image regenerating unit 205, a frame memory 206, an in-loop filtering unit 207, an output terminal 208, and a quantization matrix decoding unit 209.

The components of the image decoding apparatus and their operations in the above-described arrangement of the image decoding apparatus will be described below. Note that the image decoding apparatus is configured to input, on a frame basis, a bit stream generated by the above-described image encoding apparatus but may be configured to input a still image bit stream for one frame. The second embodiment will describe only intra prediction decoding processing for the sake of descriptive simplicity but the present invention is not limited to this and is also applicable to inter prediction decoding processing.

The separation decoding unit 202 inputs an encoded bit stream via the input terminal 201, separates information concerning decoding processing and code data concerning a coefficient from the bit stream, and decodes code data existing in the header portion of the bit stream. The separation decoding unit 202 according to this embodiment separates encoded data of a quantization matrix from the encoded bit stream, and supplies the encoded data to the quantization matrix decoding unit 209. The separation decoding unit 202 also separates encoded data of image data from the encoded bit stream, and supplies it to the decoding unit 203. In other words, the separation decoding unit 202 performs an operation reverse to that of the combined encoding unit 111 shown in FIG. 1.

The quantization matrix decoding unit 209 decodes the encoded data of the quantization matrix supplied from the separation decoding unit 202, and regenerates and holds quantization matrices 800 to 803.

The decoding unit 203 decodes the code data of the image data input from the separation decoding unit 202, and regenerates a quantization coefficient and prediction information.

Similar to the inverse quantizing/inverse transforming unit 106 shown in FIG. 1, the inverse quantizing/inverse transforming unit 204 performs inverse quantization for the quantization coefficient using one of the regenerated quantization matrices 800 to 803 to obtain a transform coefficient, and further performs inverse orthogonal transformation to regenerate prediction error data.

The image regenerating unit 205 generates predicted image data based on the input prediction information by referring to the frame memory 206, as needed. Then, the image regenerating unit 205 regenerates the image data by adding the prediction error data regenerated by the inverse quantizing/inverse transforming unit 204 to the prediction image data, and stores the regenerated image data in the frame memory 206.

Similar to the in-loop filtering unit 109 shown in FIG. 1, the in-loop filtering unit 207 performs in-loop filtering processing such as deblocking filtering for the regenerated image data stored in the frame memory 207, and stores again, in the frame memory, the image data having undergone the filtering processing. Then, the output terminal 208 outputs the regenerated image data to an external device (for example, a display device).

The operation of each component in the image decoding apparatus shown in FIG. 2 will be described in more detail next.

The second embodiment adopts the arrangement for inputting, on a frame basis, the bit stream generated in the first embodiment but may adopt an arrangement for inputting a still image bit stream for one frame. Furthermore, this embodiment will describe only intra prediction decoding processing for the sake of descriptive simplicity but the present invention is not limited to this and is also applicable to inter prediction decoding processing.

The bit stream for one frame input via the input terminal 201 is supplied to the separation decoding unit 202. The separation decoding unit 202 separates information concerning decoding processing and code data concerning a coefficient from the bit stream, and decodes code data existing in the header portion of the bit stream. More specifically, the separation decoding unit 202 regenerates the code data of the quantization matrix. The separation decoding unit 202 according to this embodiment extracts the code data of the quantization matrix from the sequence header of the bit stream shown in FIG. 6A, and supplies it to the quantization matrix decoding unit 209. Subsequently, the separation decoding unit 202 regenerates sub-block-based code data of the basic block of picture data, and supplies it to the decoding unit 203.

The quantization matrix decoding unit 209 decodes the input code data of the quantization matrix, and regenerates a plurality of one-dimensional difference matrices. In this embodiment, decoding is performed using an encoding table shown in FIG. 12A (or FIG. 12B), similar to the first embodiment. However, the encoding table is not limited to this, and another encoding table may be used as long as it is the same as in the first embodiment. The quantization matrix decoding unit 209 inversely scans the plurality of regenerated one-dimensional difference matrices to regenerate a plurality of two-dimensional quantization matrices. In this example, an operation reverse to the scan of the quantization matrix encoding unit 113 of the first embodiment is performed. That is, the quantization matrix decoding unit 209 according to this embodiment regenerates the quantization matrices 800 to 803 shown in FIGS. 8A to 8D from difference matrices 1000 to 1003 shown in FIGS. 11A to 11D using the scan methods shown in FIGS. 10A to 10D, respectively, and holds the regenerated quantization matrices 800 to 803.

The practical quantization matrix decoding processing according to this embodiment will be described by exemplifying the decoding processing of the quantization matrix 801 of 16×8 pixels shown in FIG. 8B. The quantization matrix decoding unit 209 regenerates the quantization matrix shown in FIG. 8B from a difference matrix 1001 shown in FIG. 11B using the scan method shown in FIG. 10B. The quantization matrix decoding unit 209 calculates "4" as the first element from "8" as an initial value and the first difference value "−4" in FIG. 11B, decides the value "4" of an element at a position of the 0th row and the 0th column as the first scan position in FIG. 10B, and arranges the element "4" in a portion in the 0th row and the 0th column in FIG. 8B. Next, the quantization matrix decoding unit 209 calculates "5" as the second element from the element "4" in the 0th row and the 0th column in FIG. 8B and the second difference value "1" in FIG. 11B, and arranges "5" in a portion in the 0th row and the first column as the second scan position in FIG. 10B. Similarly, the quantization matrix decoding unit 209 calculates "9" as the third element from the element "5" in the 0th row and the first column in FIG. 8B and the second difference value "4" in FIG. 11B, and arranges "9" in a portion in the first row and the 0th column and the first row and the first column as the third scan position in FIG. 8B. It is possible to regenerate the quantization matrix 801 shown in FIG. 8B by repeating the similar processing.

As described above, it is possible to decode the bit stream, in which quantization of a low-frequency portion to which human vision is sensitive is finely controlled, while reducing the code amount by arranging individual values in a plurality of elements corresponding to the low-frequency components of the quantization matrix and arranging a value on a basis of a plurality of elements with respect to the remaining elements.

Referring back to FIG. 2, the decoding unit 203 decodes the code data of each sub-block in the basic block, and regenerates the quantization coefficient and the prediction information. The decoding unit 203 supplies the regenerated quantization coefficient to the inverse quantizing/inverse transforming unit 204, and supplies the regenerated prediction information to the image regenerating unit 205.

The inverse quantizing/inverse transforming unit 204 performs, on a sub-block basis, inverse quantization for the input quantization coefficient using one of the quantization matrices 800 to 803 regenerated and held by the quantization matrix decoding unit 209, thereby generating an orthogonal transformation coefficient. The inverse quantizing/inverse transforming unit 204 also regenerates prediction error data by performing inverse orthogonal transformation for the generated orthogonal transformation coefficient on a sub-block basis, and supplies it to the image regenerating unit 205. At this time, the quantization matrix to be used is determined in accordance with the size of the sub-block to be decoded. This embodiment assumes that the quantization matrix 803 shown in FIG. 8D is used for sub-block division corresponding to FIG. 7A. Similarly, the quantization matrix 802 shown in FIG. 8C is used for sub-block division shown in FIG. 7C. The quantization matrix 801 shown in FIG. 8B is used for sub-block division shown in FIG. 7D. Furthermore, the quantization matrix shown in FIG. 8A is used for quad-tree sub-block division shown in FIG. 7B.

The image regenerating unit 205 regenerates the predicted image data on a sub-block basis based on the prediction information input from the decoding unit 203 by referring to the frame memory 206, as needed. Then, the image regenerating unit 205 regenerates the image data of the sub-block by adding, to the predicted image data, the prediction error data supplied from the inverse quantizing/inverse transforming unit 204, and stores the regenerated image data in the frame memory 206. The image data stored in the frame memory 206 is a prediction reference candidate when decoding another sub-block.

Similar to the in-loop filtering unit 109 shown in FIG. 1, the in-loop filtering unit 207 reads out the regenerated image data from the frame memory 206 on a sub-block basis, and performs in-loop filtering processing such as deblocking filtering. Then, the in-loop filtering unit 207 stores again, in the frame memory 206, the image having undergone the filtering processing.

The regenerated image stored in the frame memory 206 is finally, externally output from the terminal 208.

The processing procedure of decoding processing of one frame in the image decoding apparatus according to the second embodiment will be described below with reference to a flowchart shown in FIG. 4. Note that in the following description, in each step, the main subject executes each process under the control of the control unit 250.

In step S401, the separation decoding unit 202 separates information concerning the decoding processing and code data concerning a coefficient from a bit stream, thereby decoding code data of a header portion. More specifically, the separation decoding unit 202 regenerates code data of a quantization matrix.

In step S402, the quantization matrix decoding unit 209 decodes the code data of the quantization matrix regenerated in step S401 to regenerate the one-dimensional difference matrices 1000 to 1003 shown in FIGS. 11A to 11D. Furthermore, the quantization matrix decoding unit 209 inversely scans the regenerated one-dimensional difference matrices 1000 to 1003 to regenerate two-dimensional quantization matrices. That is, the quantization matrix decoding unit 209 inversely scans the difference matrices 1000 to 1003 shown in FIGS. 11A to 11D to regenerate the quantization matrices 800 to 803 shown in FIGS. 8A to 8D using the scan methods shown in FIG. 10A to 10D, respectively, and holds them. Note that the decoding side apparatus already knows the scan methods shown in FIGS. 10A to 10D and assignment of elements of the quantization matrices to transform coefficients. That is, each element of the quantization matrix is assigned to a transform coefficient in accordance with the distance from an element corresponding to the DC component of the transform coefficient.

That is, the quantization matrix decoding unit 209 assigns one element at a position corresponding to each transform coefficient within a preset predetermined range (a range of a distance "1" in this embodiment) from the storage position of the element corresponding to the DC component in the long side direction of the quantization matrix shown in FIG. 8B or 8C whose size is the same as that of the basic block (a size of 16×16 pixels in this embodiment) in only one of the horizontal and vertical directions and is different in the other direction, and assigns the same element on a basis of a preset number (two in this embodiment) of elements of the transform coefficients at a position outside the predetermined range in the long side direction. On the other hand, in the short side direction of the quantization matrix shown in FIG. 8B or 8C, an element of the quantization matrix is assigned for each transform coefficient.

With respect to the quantization matrix whose size is the same as that of the basic block in both the horizontal and vertical directions, the quantization matrix decoding unit 209 individually assigns, for respective corresponding transform coefficients, four elements (a range of a distance "1" in this embodiment) at the position of the element corresponding to the DC component and positions adjacent to that position on the right, lower, and lower right sides, as shown in FIG. 8D. With respect to the remaining transform coefficients, the quantization matrix decoding unit 209 assigns one element for four adjacent transform coefficients. In the case of the quantization matrix 800 of the size of 8×8 pixels, as shown in FIG. 8A, an element is held for each transform coefficient.

Since assignment of elements to transform coefficients is changed adaptively in accordance with the size of the quantization matrix, it is possible to suppress the code amount of the quantization matrix and suppress image quality deterioration.

Note that the "predetermined range" may be defined based on the scan order shown in each of FIGS. 10A to 10D when decoding the elements of the quantization matrix. With respect to the block size of the transform coefficients of 8×16 or 16×8 pixels, a scan shown in FIG. 10B or 10C is performed for decoding of the elements of the quantization matrix. At this time, the quantization matrix decoding unit 209 assigns, for each transform coefficient, an element obtained by one scan operation (a range of a distance "1") from the element corresponding to the DC component of the transform coefficient, and then assigns one element for every two transform coefficients. That is, the quantization matrix 801 or 802 shown in FIG. 8B or 8C is obtained. With respect to the block size of the transform coefficients of 16×16 pixels, the quantization matrix decoding unit 209 assigns, for respective transform coefficients, elements obtained by three scan operations (a range of a distance "3") from the element corresponding to the DC component of the transform coefficient, and then assigns one element for every four transform coefficients. That is, the quantization matrix 803 shown in FIG. 8D is obtained. With respect to the block size of the transform coefficients of 8×8 pixels, the quantization matrix decoding unit 209 assigns, for respective transform coefficients, elements obtained by scanning all the elements from the element corresponding to the DC component of the transform coefficient. That is, the quantization matrix shown in FIG. 8A is obtained. As described above, based on the scan on the quantization matrix, assignment of elements to the transform coefficients may be adaptively changed in accordance with the size of the quantization matrix. In this case, it is unnecessary to particularly consider the positional relationship between the elements.

In step S403, the decoding unit 203 decodes the code data separated in step S401, and regenerates the prediction information and the quantization coefficient for each sub-block.

In step S404, the inverse quantizing/inverse transforming unit 204 obtains, for each sub-block, the transform coefficient by performing inverse quantization using one of the quantization matrices 800 to 803 regenerated in step S402 for the quantization coefficient. The inverse quantizing/ inverse transforming unit 204 also performs inverse orthogonal transformation for the transform coefficient to regenerate prediction error data of each sub-block.

In step S405, the image regenerating unit 205 regenerate prediction information and predicted image data for each sub-block generated in step S403. Then, the image regenerating unit 205 regenerate the image data for each sub-block by adding the prediction error data generated in step S404 to the regenerated predicted image data.

In step S406, the control unit 250 determines whether decoding of all the basic blocks in the frame has ended. If it is determined that decoding has ended, the control unit 250 advances to step S407; otherwise, the control unit 250 returns the process to step S403 to decode the next basic block.

In step S407, the in-loop filtering unit 207 performs in-loop filtering processing for the image data regenerated in step S405 to generate an image having undergone the filtering processing, thereby ending the processing.

Note that when decoding the second frame or a subsequent frame of the moving image, the processes in steps S403 to S407 are repeated until the end of the encoded bit stream or until a stop instruction is received from the user via an operation unit (not shown).

With the above-described arrangement and operation, it is possible to decode the bit stream with the reduced code amount of the quantization matrix, generated in the first embodiment, in which only first some elements of the quantization matrix are individually encoded and the remaining elements are encoded on a basis of a plurality of elements.

Note that the second embodiment adopts the arrangement for decoding all the four kinds of quantization matrices 800 to 803 shown in FIGS. 8A to 8D from a bit stream but may adopt an arrangement for generating another quantization matrix from one quantization matrix decoded from a bit stream. For example, a quantization matrix of 16×8 pixels may be generated using a quantization matrix of 16×16 pixels decoded from a bit stream, instead of being decoded from a bit stream. In this case, the quantization matrix shown in FIG. 8B is generated by thinning out some elements from the quantization matrix shown in FIG. 8D. Similarly, the quantization matrix shown in FIG. 8C is generated by thinning out some elements from the quantization matrix shown in FIG. 8D. Furthermore, by deciding a method of calculating the element "5" in the 0th row and the first column in FIG. 8B or the element "5" in the first row and the 0th column in FIG. 8C within the above-described "predetermined range", it is possible to generate the quantization matrix 801 shown in FIG. 8B or the quantization matrix 802 shown in FIG. 8C using the quantization matrix 800 shown in FIG. 8A. The calculation method at this time is not particularly limited. Calculation may be performed by adding a specific difference value (+1 in this embodiment) to the element "4" in the 0th row and the 0th column or by using interpolation with peripheral elements. Furthermore, the element "5" in the 0th row and the first column in FIG. 8B or the element "5" in the first row and the 0th column in FIG. 8C may be decoded from the bit stream together with elements of the quantization matrix of 16×16 pixels. This can decode the bit stream with the further reduced code amount of the quantization matrix.

Furthermore, an arrangement for decoding, from a header, an identifier for selecting whether to generate each quantization matrix from another quantization matrix or decode each element may be adopted. For example, an arrangement for decoding, as a quantization matrix encoding method information code, from the header portion of the bit stream shown in FIG. 6B, information indicating whether to generate each element of a quantization matrix from another quantization matrix or decode each element individually may be adopted. This can decode the bit stream for which whether to prioritize image quality control according to the size of the sub-block or reduce the code amount of the quantization matrix is selected.

This embodiment adopts the arrangement in which the quantization matrices 800 to 803 shown in FIGS. 8A to 8D corresponding to the sub-block division/orthogonal transformation processes shown in FIGS. 7A to 7D are used. However, the orthogonal transformation size and quantization matrix used are not limited to them. For example, if ternary-tree division for division at a ratio of 1:2:1, as shown in FIG. 7E or 7F is further used, a quantization matrix 900 or 901 shown in FIG. 9A or 9B may further be used.

Third Embodiment

Each of the above-described embodiments assumes that each processing unit shown in FIG. 1 or 2 is formed by a hardware component. However, processing performed by each processing unit shown in FIG. 1 or 2 may be implemented by a computer program.

FIG. 5 is a block diagram showing an example of the hardware arrangement of a computer applicable to an image display device according to each of the above-described embodiments.

A CPU 501 executes each of the processes described as those performed by an image processing apparatus according to each of the above-described embodiments while controlling the overall computer using a computer program and data stored in a RAM 502 or a ROM 503. That is, the CPU 501 functions as each processing unit shown in FIG. 1 or 2.

The RAM 502 includes an area for temporarily storing a computer program and data loaded from an external storage device 506, data externally acquired via an I/F (interface) 507, and the like. Furthermore, the RAM 502 includes a work area used by the CPU 501 to execute various kinds of processes. That is, for example, the RAM 502 can be assigned as a frame memory and can provide other various areas appropriately.

The ROM 503 stores the setting data, boot program, and the like of the computer. An operation unit 504 is formed by a keyboard, a mouse, and the like, and can input various instructions to the CPU 501 when operated by the user of the computer. A display unit 505 displays a processing result of the CPU 501. The display unit 505 is formed by, for example, a liquid crystal display.

The external storage device 506 is a large-capacity information storage device represented by a hard disk drive. The external storage device 506 stores an OS (Operating System) and a computer program for causing the CPU 501 to implement the function of each unit shown in FIG. 1 or 2. Furthermore, the external storage device 506 may store each image data as a processing target.

The computer program and data stored in the external storage device 506 are loaded into the RAM 502, as needed, under the control of the CPU 501, and are processing targets of the CPU 501. The I/F 507 can be connected to a network such as a LAN or the Internet, and other devices such as a projection device and a display device. The computer can acquire or send various kinds of information via the I/F 507. Reference numeral 508 denotes a bus that connects the above-described units.

In the above arrangement, when the apparatus is powered on, the CPU 501 executes the boot program in the ROM 503, loads the OS stored in the external storage device 506 into the RAM 502, and activates the OS. As a result, this apparatus can perform communication via the interface 507, thereby functioning as an information processing apparatus. Then, when, under the control of the OS, the CPU 501 loads an application (corresponding to FIG. 3) concerning image encoding from the external storage device 506 into the RAM 502 and executes it, the CPU 501 functions as the various processing units shown in FIG. 1, and this apparatus functions as an image encoding apparatus. On the other hand, when the CPU 501 loads an application (corresponding to FIG. 4) concerning image decoding from the external storage device 506 into the RAM 502 and executes it, the CPU 501 functions as the various processing units shown in FIG. 2, and this apparatus functions as an image decoding apparatus.

According to the present invention, it is possible to encode an image while suppressing the code amount of a quantization matrix used for encoding. Other features and advantages of the present invention will be apparent from the following description taken in conjunction with the accompanying drawings. Note that the same reference numerals denote the same or like components throughout the accompanying drawings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image decoding apparatus for decoding an image from encoded data, the apparatus comprising:
   a decoding unit configured to decode data for indicating a plurality of difference values for a quantization matrix used for inverse quantizing processing which derives transform coefficients from quantized transform coefficients;
   a deriving unit configured to derive a plurality of values corresponding to at least a part of elements in the quantization matrix by using the data, and derive the quantization matrix based on the plurality of values; and
   an inverse quantizing unit configured to perform the inverse quantizing processing on an object block using the quantization matrix,
   wherein, in a case where a width of the object block is 16 samples and a height of the object block is 8 samples, the deriving unit derives the quantization matrix by:
      setting a first value among the plurality of values as a first element corresponding to DC component in the quantization matrix, wherein the first value is not set for a plurality of elements in the quantization matrix used for the inverse quantizing processing, and the first value is derived by using difference from a predetermined initial value;
      setting a second value among the plurality of values as a second element adjacent to the first element on a right side of the first element, wherein the second value is not set for a plurality of elements in the quantization matrix used for the inverse quantizing processing, and the second value is derived by using difference from the first value; and
      setting a third value among the plurality of values as a third element and a fourth element, wherein the third element is adjacent to the first element and is below the first element, the fourth element is adjacent to the second element and is below the second element, and the third value is derived by using difference from the second value, and
   wherein, in a case where a width of the object block is 8 samples and a height of the object block is 16 samples, the deriving unit derives the quantization matrix by:
      setting a first value among the plurality of values as a first element corresponding to DC component in the quantization matrix, wherein the first value is not set for a plurality of elements in the quantization matrix used for the inverse quantizing processing, and the first value is derived by using difference from a predetermined initial value;
      setting a second value among the plurality of values as a second element which is adjacent to the first element and is below the first element, wherein the second value is not set for a plurality of elements in the quantization matrix used for the inverse quantizing processing, and the second value is derived by using difference from the first value; and
      setting a third value among the plurality of values as a third element and a fourth element, wherein the third element is adjacent to the second element and is below the second element, the fourth element is adjacent to the third element and is below the third element, and the third value is derived by using difference from the second value.

2. The apparatus according to claim 1, wherein the number of the plurality of values is less than the number of elements in the quantization matrix.

3. An image encoding apparatus for encoding an image, the apparatus comprising;
   a dividing unit configured to divide the image into a plurality of blocks;
   a quantizing unit configured to perform quantizing processing on an object block using a quantization matrix; and
   an encoding unit configured to encode data for indicating a plurality of values corresponding to at least a part of elements in the quantization matrix,
   wherein, in a case where a width of the object block is 16 samples and a height of the object block is 8 samples, the data includes:
      data indicating difference between a predetermined initial value and a first value which is set as a first element corresponding to DC component in the quantization matrix and is not set for a plurality of elements in the quantization matrix used for the quantizing processing;
      data indicating difference between the first value and a second value which is set as a second element adjacent to the first element on a right side of the first element and is not set for a plurality of elements in the quantization matrix used for the quantizing processing; and
      data indicating difference between the second value and a third value which is set as a third element and a fourth element, wherein the third element is adjacent to the first element and is below the first element, the fourth element is adjacent to the second element and is below the second element, and
   wherein, in a case where a width of the object block is 8 samples and a height of the object block is 16 samples, the data includes:
      data indicating difference between a predetermined initial value and a first value which is set as a first element corresponding to DC component in the quantization matrix and is not set for a plurality of elements in the quantization matrix used for the quantizing processing;
      data indicating difference between the first value and a second value which is set as a second element which is adjacent to the first element and is below the first element, wherein the second value is not set for a plurality of elements in the quantization matrix used for the quantizing processing; and
      data indicating difference between the second value and a third value which is set as a third element and a fourth element, wherein the third element is adjacent to the second element and is below the second element, and the fourth element is adjacent to the third element and is below the third element.

4. The apparatus according to claim 3, wherein the number of the plurality of values is less than the number of elements in the quantization matrix.

5. An image decoding method for decoding an image from encoded data, the method comprising:
   decoding data for indicating a plurality of difference values for a quantization matrix used for inverse quantizing processing which derives transform coefficients from quantized transform coefficients;

deriving a plurality of values corresponding to at least a part of elements in the quantization matrix by using the data, and deriving the quantization matrix based on the plurality of values; and performing the inverse quantizing processing on an object block using the quantization matrix, wherein, in a case where a width of the object block is 16 samples and a height of the object block is 8 samples, the deriving unit derives the quantization matrix by:

setting a first value among the plurality of values as a first element corresponding to DC component in the quantization matrix, wherein the first value is not set for a plurality of elements in the quantization matrix used for the inverse quantizing processing, and the first value is derived by using difference from a predetermined initial value;

setting a second value among the plurality of values as a second element adjacent to the first element on a right side of the first element, wherein the second value is not set for a plurality of elements in the quantization matrix used for the inverse quantizing processing, and the second value is derived by using difference from the first value; and setting a third value among the plurality of values as a third element and a fourth element, wherein the third element is adjacent to the first element and is below the first element, the fourth element is adjacent to the second element and is below the second element, and the third value is derived by using difference from the second value, and wherein, in a case where a width of the object block is 8 samples and a height of the object block is 16 samples, the deriving unit derives the quantization matrix by:

setting a first value among the plurality of values as a first element corresponding to DC component in the quantization matrix, wherein the first value is not set for a plurality of elements in the quantization matrix used for the inverse quantizing processing, and the first value is derived by using difference from a predetermined initial value;

setting a second value among the plurality of values as a second element which is adjacent to the first element and is below the first element, wherein the second value is not set for a plurality of elements in the quantization matrix used for the inverse quantizing processing, and the second value is derived by using difference from the first value; and setting a third value among the plurality of values as a third element and a fourth element, wherein the third element is adjacent to the second element and is below the second element, the fourth element is adjacent to the third element and is below the third element, and the third value is derived by using difference from the second value.

6. The method according to claim 5, wherein the number of the plurality of values is less than the number of elements in the quantization matrix.

7. An image encoding method for encoding an image, the method comprising;

dividing the image into a plurality of blocks;

performing quantizing processing on an object block using a quantization matrix; and encoding data for indicating a plurality of values corresponding to at least a part of elements in the quantization matrix, wherein, in a case where a width of the object block is 16 samples and a height of the object block is 8 samples, the data includes:

data indicating difference between a predetermined initial value and a first value which is set as a first element corresponding to DC component in the quantization matrix and is not set for a plurality of elements in the quantization matrix used for the quantizing processing;

data indicating difference between the first value and a second value which is set as a second element adjacent to the first element on a right side of the first element and is not set for a plurality of elements in the quantization matrix used for the quantizing processing; and data indicating difference between the second value and a third value which is set as a third element and a fourth element, wherein the third element is adjacent to the first element and is below the first element, the fourth element is adjacent to the second element and is below the second element, and wherein, in a case where a width of the object block is 8 samples and a height of the object block is 16 samples, the data includes:

data indicating difference between a predetermined initial value and a first value which is set as a first element corresponding to DC component in the quantization matrix and is not set for a plurality of elements in the quantization matrix used for the quantizing processing;

data indicating difference between the first value and a second value which is set as a second element which is adjacent to the first element and is below the first element, wherein the second value is not set for a plurality of elements in the quantization matrix used for the quantizing processing; and data indicating difference between the second value and a third value which is set as a third element and a fourth element, wherein the third element is adjacent to the second element and is below the second element, and the fourth element is adjacent to the third element and is below the third element.

8. The method according to claim 7, wherein the number of the plurality of values is less than the number of elements in the quantization matrix.

9. A non-transitory computer-readable storage medium which stores a program for executing an image decoding method for decoding an image from encoded data, the method comprising:

decoding data for indicating a plurality of difference values for a quantization matrix used for inverse quantizing processing which derives transform coefficients from quantized transform coefficients;

deriving a plurality of values corresponding to at least a part of elements in the quantization matrix by using the data, and deriving the quantization matrix based on the plurality of values; and performing the inverse quantizing processing on an object block using the quantization matrix, wherein, in a case where a width of the object block is 16 samples and a height of the object block is 8 samples, the deriving unit derives the quantization matrix by:

setting a first value among the plurality of values as a first element corresponding to DC component in the quantization matrix, wherein the first value is not set for a plurality of elements in the quantization matrix used for the inverse quantizing processing, and the first value is derived by using difference from a predetermined initial value;

setting a second value among the plurality of values as a second element adjacent to the first element on a right side of the first element, wherein the second value is not set for a plurality of elements in the quantization matrix used for the inverse quantizing processing, and the second value is derived by using difference from the first value; and setting a third value among the plurality of values as a third element and a fourth element, wherein the third element is adjacent to the first element and is below the first element, the fourth element is adjacent to the second element and is below the second element, and the third value is derived by using difference from the second value, and wherein, in a case where a width of the object block is 8 samples and a height of the object block is 16 samples, the deriving unit derives the quantization matrix by:

setting a first value among the plurality of values as a first element corresponding to DC component in the quantization matrix, wherein the first value is not set for a plurality of elements in the quantization matrix used for the inverse quantizing processing, and the first value is derived by using difference from a predetermined initial value;

setting a second value among the plurality of values as a second element which is adjacent to the first element and is below the first element, wherein the second value is not set for a plurality of elements in the quantization matrix used for the inverse quantizing processing, and the second value is derived by using difference from the first value; and setting a third value among the plurality of values as a third element and a fourth element, wherein the third element is adjacent to the second element and is below the second element, the fourth element is adjacent to the third element and is below the third element, and the third value is derived by using difference from the second value.

10. A non-transitory computer-readable storage medium which stores a program for executing an image encoding method for encoding an image, the method comprising;

dividing the image into a plurality of blocks;

performing quantizing processing on an object block using a quantization matrix; and encoding data for indicating a plurality of values corresponding to at least a part of elements in the quantization matrix, wherein, in a case where a width of the object block is 16 samples and a height of the object block is 8 samples, the data includes:

data indicating difference between a predetermined initial value and a first value which is set as a first element corresponding to DC component in the quantization matrix and is not set for a plurality of elements in the quantization matrix used for the quantizing processing;

data indicating difference between the first value and a second value which is set as a second element adjacent to the first element on a right side of the first element and is not set for a plurality of elements in the quantization matrix used for the quantizing processing; and data indicating difference between the second value and a third value which is set as a third element and a fourth element, wherein the third element is adjacent to the first element and is below the first element, the fourth element is adjacent to the second element and is below the second element, and wherein, in a case where a width of the object block is 8 samples and a height of the object block is 16 samples, the data includes:

data indicating difference between a predetermined initial value and a first value which is set as a first element corresponding to DC component in the quantization matrix and is not set for a plurality of elements in the quantization matrix used for the quantizing processing;

data indicating difference between the first value and a second value which is set as a second element which is adjacent to the first element and is below the first element, wherein the second value is not set for a plurality of elements in the quantization matrix used for the quantizing processing; and data indicating difference between the second value and a third value which is set as a third element and a fourth element, wherein the third element is adjacent to the second element and is below the second element, and the fourth element is adjacent to the third element and is below the third element.

* * * * *